United States Patent
Goudey

[11] Patent Number: 5,263,770
[45] Date of Patent: Nov. 23, 1993

[54] VEHICLE WHEEL COVER

[76] Inventor: Robert B. Goudey, 3 Selwyn Cr., Kanata, Ontairo, Canada

[21] Appl. No.: 789,038

[22] Filed: Nov. 7, 1991

[51] Int. Cl.$^5$ .................... B60B 7/04; B60B 7/06
[52] U.S. Cl. .................... 301/37.37; 301/37.1; 301/108.4
[58] Field of Search .......... 301/37.37, 37.1, 37.35, 301/37.36, 37.42, 108.1, 108.3, 108.4

[56] References Cited

U.S. PATENT DOCUMENTS

| | | |
|---|---|---|
| 2,722,822 | 11/1955 | Thomas ............... 301/37 S X |
| 3,092,420 | 6/1963 | Baldwin et al. . |
| 3,248,915 | 5/1966 | Scheiman . |
| 3,317,247 | 5/1967 | Lamme . |
| 3,833,266 | 9/1974 | Lamme . |
| 3,918,764 | 11/1975 | Lamme . |
| 4,040,672 | 8/1977 | Imahashi ............... 301/108 A |
| 4,235,476 | 11/1980 | Arvidsson . |
| 4,306,751 | 12/1981 | Wegner ............... 301/37 S X |
| 4,632,465 | 12/1986 | Cummings . |
| 4,761,040 | 8/1988 | Johnson . |
| 4,932,724 | 6/1990 | Wright . |
| 4,974,909 | 12/1990 | Patti et al. . |
| 4,984,851 | 1/1991 | Hayano . |
| 5,108,157 | 4/1992 | Chen ............... 301/37 R X |
| 5,112,112 | 5/1992 | Baba ............... 301/37 TP X |
| 5,135,289 | 8/1992 | Fleck et al. ............... 301/37 R |
| 5,152,584 | 10/1992 | Maxwell, Jr. ............... 301/37 S |

FOREIGN PATENT DOCUMENTS

| | | |
|---|---|---|
| 454919 | 3/1949 | Canada ............... 301/108 S |
| 925539 | 9/1973 | Canada . |
| 2706073 | 8/1978 | Fed. Rep. of Germany ... 301/108 A |
| 2126538 | 3/1984 | United Kingdom ........... 301/37 R |
| WO90/09898 | 9/1990 | World Int. Prop. O. . |

Primary Examiner—Margaret A. Focarino
Assistant Examiner—Peter English
Attorney, Agent, or Firm—Nixon & Vanderhye

[57] ABSTRACT

A combined wheel cover and mounting device therefore intended for use on large vehicles with dual wheels such as buses, trucks, trailers and tractor-trailers. The wheel cover is a disc sized to engage the periphery of a wheel rim and cover the hub portion. The mounting device includes leg members secured to the wheel hub and a retaining ring for detachably securing the disc thereto.

10 Claims, 5 Drawing Sheets

VEHICLE WHEEL COVER

FIELD OF THE INVENTION

This invention relates to wheel covers for vehicles and in particular to a combined wheel cover and mounting apparatus for dual wheel vehicles such as trucks, trailers, tractor-trailers, buses and the like.

BACKGROUND OF THE INVENTION

Dual wheels on large commercial vehicles are characterized by the substantial depth from the plane of the outer wheel rim inwardly to the region of the wheel hub where the wheel is attached to a brake drum, axle rotor or the like. This characteristic makes it quite difficult to secure a wheel cover to a dual wheel. The rims of a dual wheel are not configured so that a wheel cover can be snapped into engagement with the rim as in the case with many passenger car wheel/wheel disc arrangements. The problems of attachment of a wheel cover to a dual wheel have not all been completely addressed in the prior art, particularly where a vehicle hub is provided with a hub odometer that projects outwardly from the end of the hub nearly to the plane of the wheel rim.

Wheel covers and attachment systems for dual-wheeled vehicles such as trucks, buses, tractor-trailers, trailers and the like, as set out in the prior art, disclose the use of numerous bolts, pins, hinges, threaded rods, adjustable multiple legs, center attachment bolts, numerous nuts and screws, kits of parts and other hardware designed to attach to the vehicle rim itself or to the bolts that hold the wheel onto the vehicle axle hub. The wheel cover in such arrangements is usually attached by means of a center bolt which projects inwardly into the space behind the wheel cover at the end of the hub. In many cases, at least one tool or a plurality of tools are required each time the wheel cover is attached to or removed from the vehicle wheel.

Most prior art designs utilize wheel covers made of a solid surface with no openings to allow for ventilation in the wheel hub well that normally assists to cool the hub area and adjacent brake surfaces. Additionally, the prior art does not appear to disclose wheel covers which may be attached to a vehicle wheel to which an axle odometer has been attached.

Some examples of the prior art disclose methods and apparatus for attaching wheel covers which include brackets that include spring clips or hooks to engage holes in the vehicle wheel rim or to engage the bolts that hold the wheel rim to the wheel hub/axle. However, this requires the mounting brackets to be removed and reinstalled every time the wheel or tire of the dual wheel is being serviced.

Thus, the prior art devices do present various deficiencies and drawbacks. For example, attachment brackets which rely on hooks or spring clips are susceptible to loosening under stress and are difficult to install. Furthermore, many of the prior art attachment systems are undesirably complex, either in the number of components required and/or the labour needed for installation and removal. Of course, the manufacturing costs of systems having a large number of components, can be prohibitive.

Examples of the prior art relative to this invention are as follows:

| UNITED STATES PATENTS | | | |
| --- | --- | --- | --- |
| | 3,092,420 | June 4, 1963 | Baldwin et al |
| | 3,248,915 | May 3, 1966 | Scheiman |
| | 3,317,247 | May 2, 1967 | Lamme |
| | 3,833,266 | Sept. 3, 1974 | Lamme |
| | 3,918,764 | Nov. 11, 1975 | Lamme |
| | 4,235,476 | Nov. 25, 1980 | Arvidsson |
| | 4,632,465 | Dec. 30, 1986 | Cummings |
| | 4,761,040 | Aug. 2, 1988 | Johnson |
| | 4,932,724 | Jun. 12, 1990 | Wright |
| | 4,974,909 | Dec. 4, 1990 | Patti et al |
| | 4,984,851 | Jan. 15, 1991 | Hayano |
| German Patent | WO 90/09898 | | |
| Canadian Patent | 925,539 | May 1, 1973 | Titze |

SUMMARY OF THE INVENTION

The present invention provides a combined wheel cover and mounting device which addresses many of the deficiencies of the prior art. In accordance with the invention, a wheel cover and mounting device provides secured and consistently centered means for attachment of wheel covers for dual-wheel type vehicles, a combination which is easy to install and remove; which is relatively inexpensive to manufacture; readily adaptable to a variety of dual wheel sizes; an arrangement which has a minimum of parts and that can accommodate the presence of an axle odometer. The arrangement according to the invention requires no tools to remove or install the wheel cover after the initial installation of the mounting device and the design of the cover is such that some ventilation is provided for the hub well and adjacent brake areas. The mounting device is not affected by the removal or installation of the dual wheel itself.

The invention is directed to the combined wheel cover and mounting device for large size vehicles with dual wheels and the cover is a disc that is preferably flat or nearly so and the body of which is composed of any suitable material though preferably of a thermal plastic synthetic resin. The diameter of the cover is sufficient to cover the portion of the wheel well in which the wheel nuts and hub are located. The outer surface of the wheel cover is intended to provide some aerodynamic improvements to reduce air turbulence caused by deep-dish dual wheels with a consequent improvement in fuel mileage.

The cover, when mounted, nests within the outer rim portion of the dual wheel and the mounting device is detachably secured to the vehicle hub, at one end, and is releasably secured, at its other end, to the inner surface of the wheel cover in such a manner as to maintain that securement under all operating conditions.

In common with many wheel covers, the periphery of the cover will engage the outer flange of the dual wheel rim. The length of the legs of the mounting device are designed so that the inner surface of the wheel cover engages the mounting device and the wheel rim flange simultaneously so as to provide a rigid attachment of the cover to the wheel. Because the wheel cover rests on the wheel rim flange, the outer face of the wheel cover is slightly recessed from the outer curvature of the side wall of the inflated tire and therefore the wheel cover is, to some extent, protected from damage as there are no protruding parts to contact other foreign bodies.

The outer surface of the wheel cover can be subjected to a surface treatment such as a formation of painted or plated layers of desired colour or ornamental designs or patterns. The entire cover can be manufactured in various coloured resin materials to match or contrast commercial colours, to the desire of the vehicle owner.

One object of the present invention is to provide an improved wheel cover and mounting device for vehicle dual wheels of an improved and simplified attachment system and in particular to accommodate a wheel to which an axle odometer has been attached to the hub portion thereof.

Another object of the invention is to provide a wheel cover and mounting device for dual wheels in which the mounting device supports the wheel cover centrally thereof on the vehicle hub and in such a way as to prevent relative rotational movement between the cover and the wheel rim which it engages.

Another object of the invention is to provide a mounting device and cover design that can be used with more than one vehicle wheel size and a variety of axle dimensions.

Another object of the invention is to provide a wheel cover mounting device which maintains a secure and consistently centered mounting point for the wheel cover and which is easy to install and remove from the vehicle.

According to a broad aspect, the invention relates to a combined wheel cover and mounting device for use on dual-wheeled vehicles, the wheel cover comprising a circular disc having an outer surface and an inner surface; a circular collar centrally located on the inner surface of the disc; the mounting device comprising a circular, disc-retaining ring and at least a pair of leg members connected at one of their ends to the ring and a foot at the other end of each leg for detachable connection of the mounting device to the hub of a vehicle wheel. The disc-retaining ring receives the collar on the inner surface of the wheel cover.

In one embodiment of the invention, releasable locking members are provided for detachably securing the collar and the cover on to the disc-retaining means.

In another embodiment, the circular collar centrally located on the inner surface of the disc has a peripheral groove and lip on the inner surface thereof and a plurality of circumferentially spaced slots therein. The associated disc-retaining ring includes a circumferentially extending, peripheral groove in the outer periphery thereof to cooperate with the lip on the collar so as to receive the collar on the inner surface of the wheel cover in a snap-on, snap-off engagement.

BRIEF DESCRIPTION OF THE DRAWINGS

The invention is illustrated by way of example in the accompanying drawings in which.

DETAILED DESCRIPTION OF THE PREFERRED EMBODIMENTS

Figure 1:
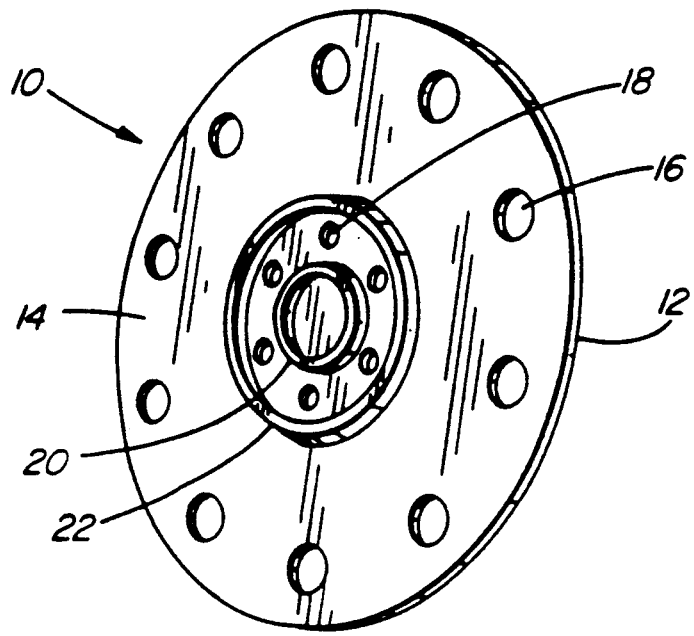
FIG. 1 is a perspective view of a wheel cover according to the invention and showing the inner surface thereof.
Figure 4:
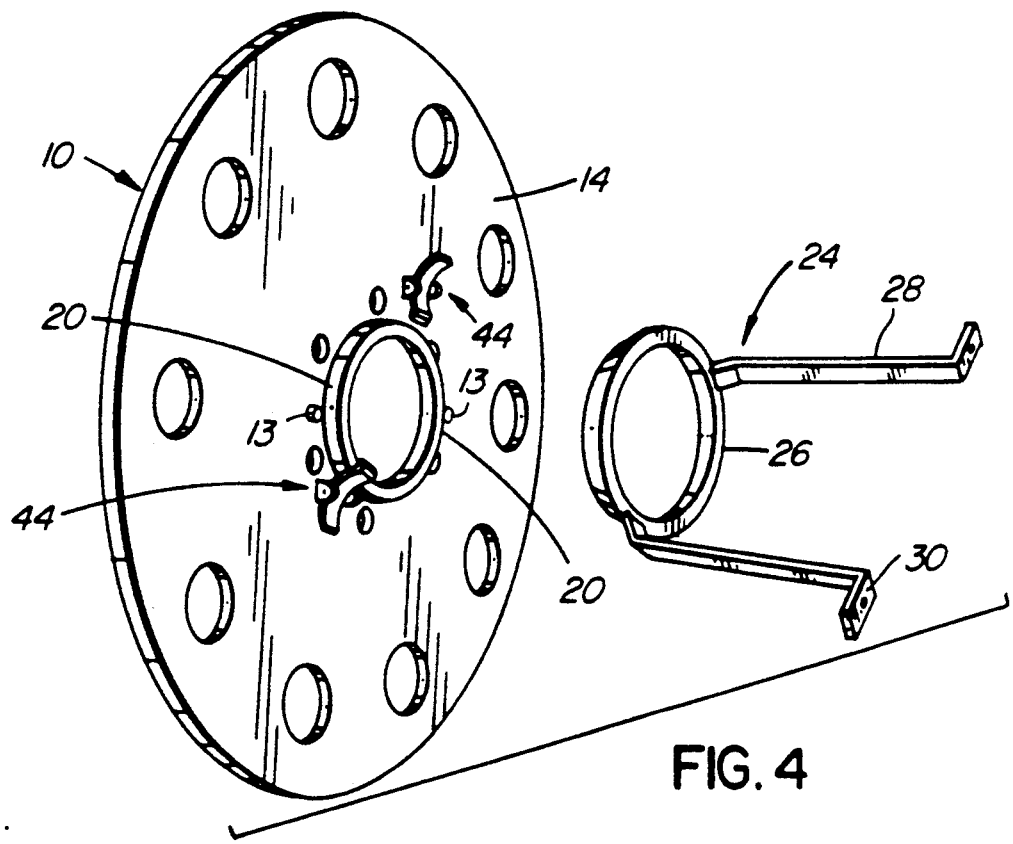
FIG. 4 is a perspective view showing the inner surface of a wheel cover relative to a mounting device.

Referring to FIGS. 1 and 4, the wheel cover is in the form of a circular disc 10 having an outer surface 12 and an inner surface 14. While the disc can be manufactured from numerous forms of material, one preferred material is a thermoplastic synthetic resin such as ABS resin, polyamide resin and polypropylene resin. In the example illustrated in FIG. 1, the disc 10 has an outer circular row of apertures 16 and an inner row of apertures 18, both of which provide air passages through the disc for ventilating the wheel well and to assist in cooling adjacent brake surfaces.

Figure 8:
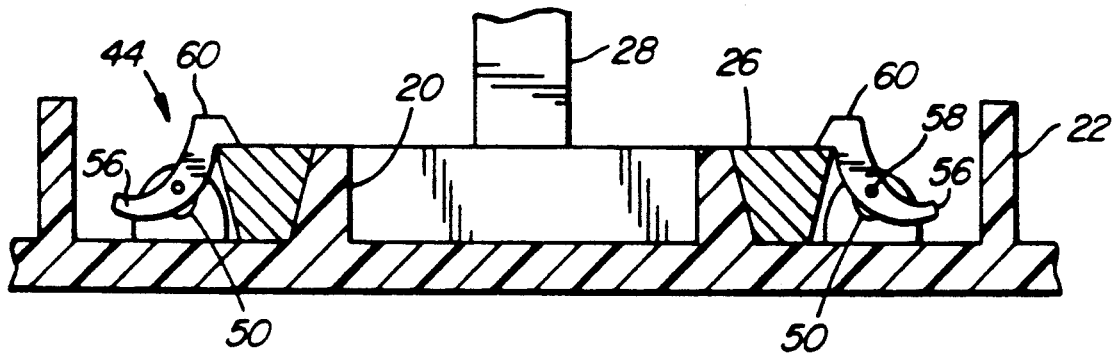
Figure 9:
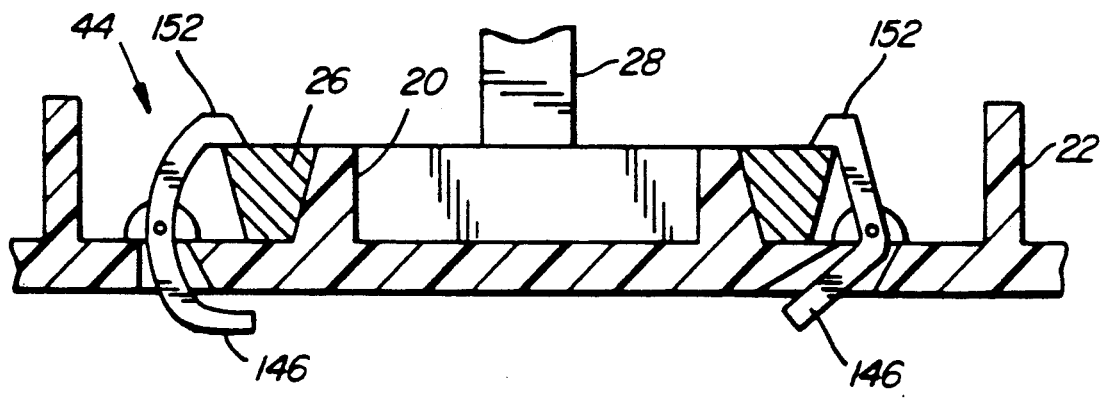
Figure 10:
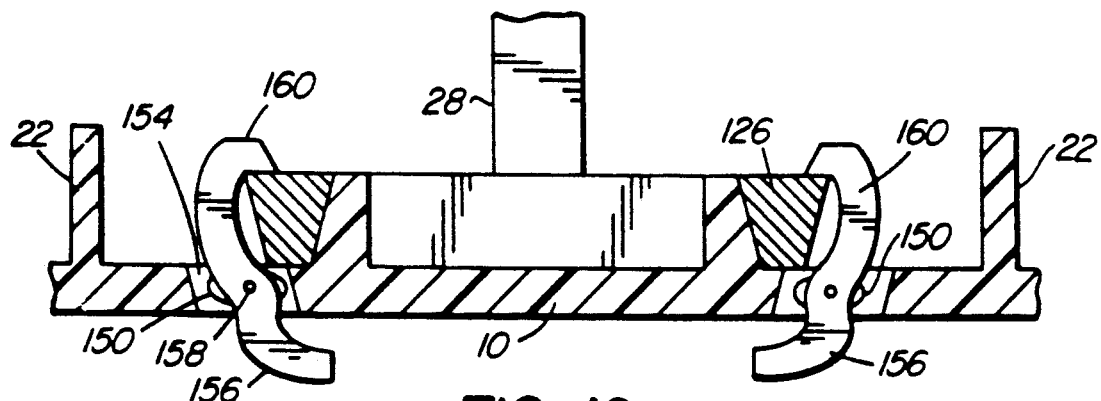

As shown in FIG. 1, the disc 10 is provided with a circular collar 20 centrally located on the inner surface 14 and, while not essential, a second, outer collar 22 may also be provided. As shown in FIGS. 8-10, the second or outer collar 22 has a noticeably greater depth than the inner collar 20, for reasons subsequently to be described.

Figure 2:
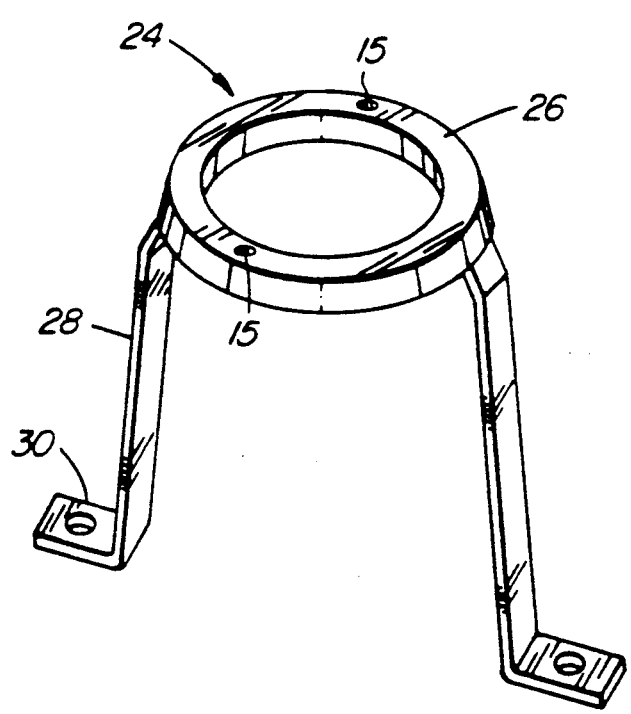
FIG. 2 is a perspective view of a wheel cover mounting device.
Figure 3:
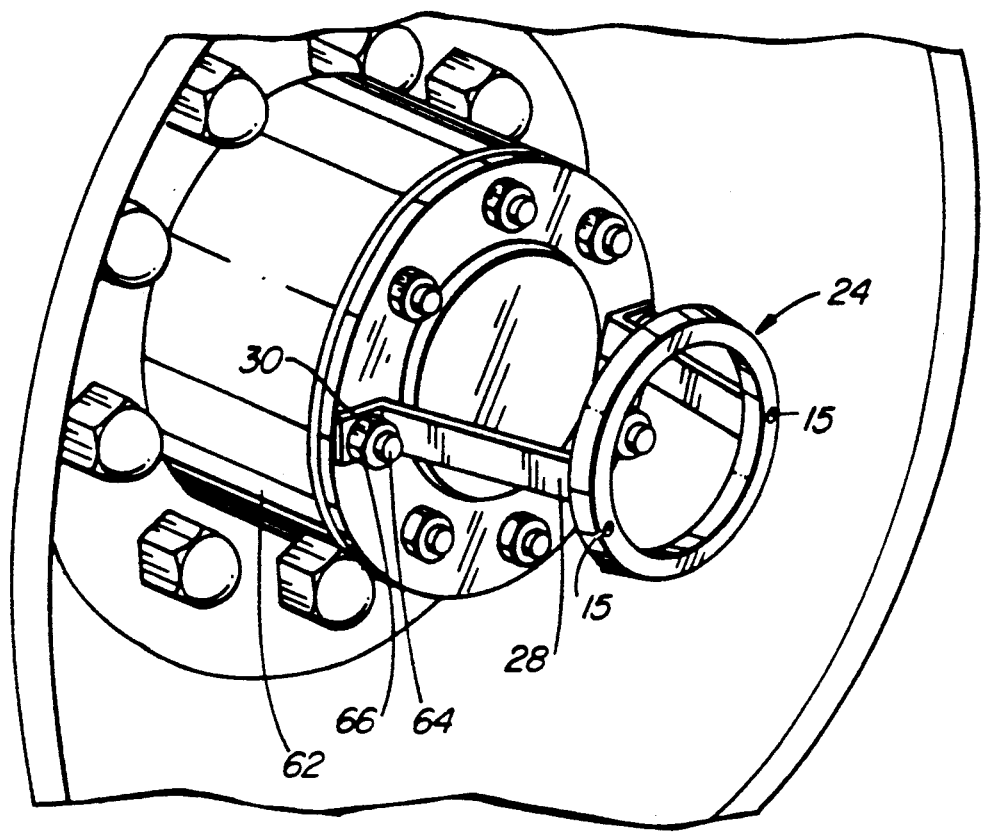
FIG. 3 is a fragmentary perspective view of a wheel cover mounting device secured to a wheel hub.

Referring to FIGS. 2 and 4, the mounting device illustrated generally at 24 consists of a circular, disc-retaining ring 26 and at least a pair of leg members 28 extending therefrom and secured at one of their ends to the disc-retaining ring 26 and provided at their other ends with feet 30 adapted to accommodate studs 64 on a wheel hub 62, as shown in FIG. 3, whereby the mounting device is rigidly but detachably secured to the vehicle wheel assembly.

Feet 30 on legs 28 may extend outwardly therefrom as shown in FIGS. 2 and 3 or they can be directed inwardly, depending on the application of the device.

The wheel cover 10 is detachably secured to the disc-retaining ring 26 and this can be accomplished in two basic forms. In one form, releasable locking members are utilized for securing the disc to the retaining ring and in another form, a snap-on, snap-off arrangement is utilized.

Figure 6A:
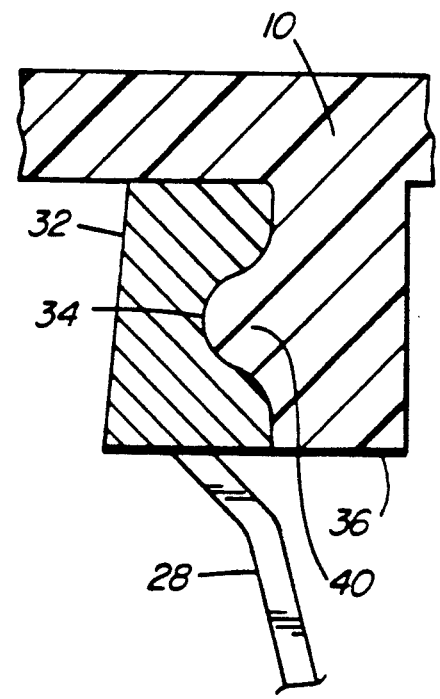
FIG. 6a is a fragmentary cross-sectional view of a portion of the collar shown in FIG. 6 and engaging the ring of a mounting means.
Figure 6:
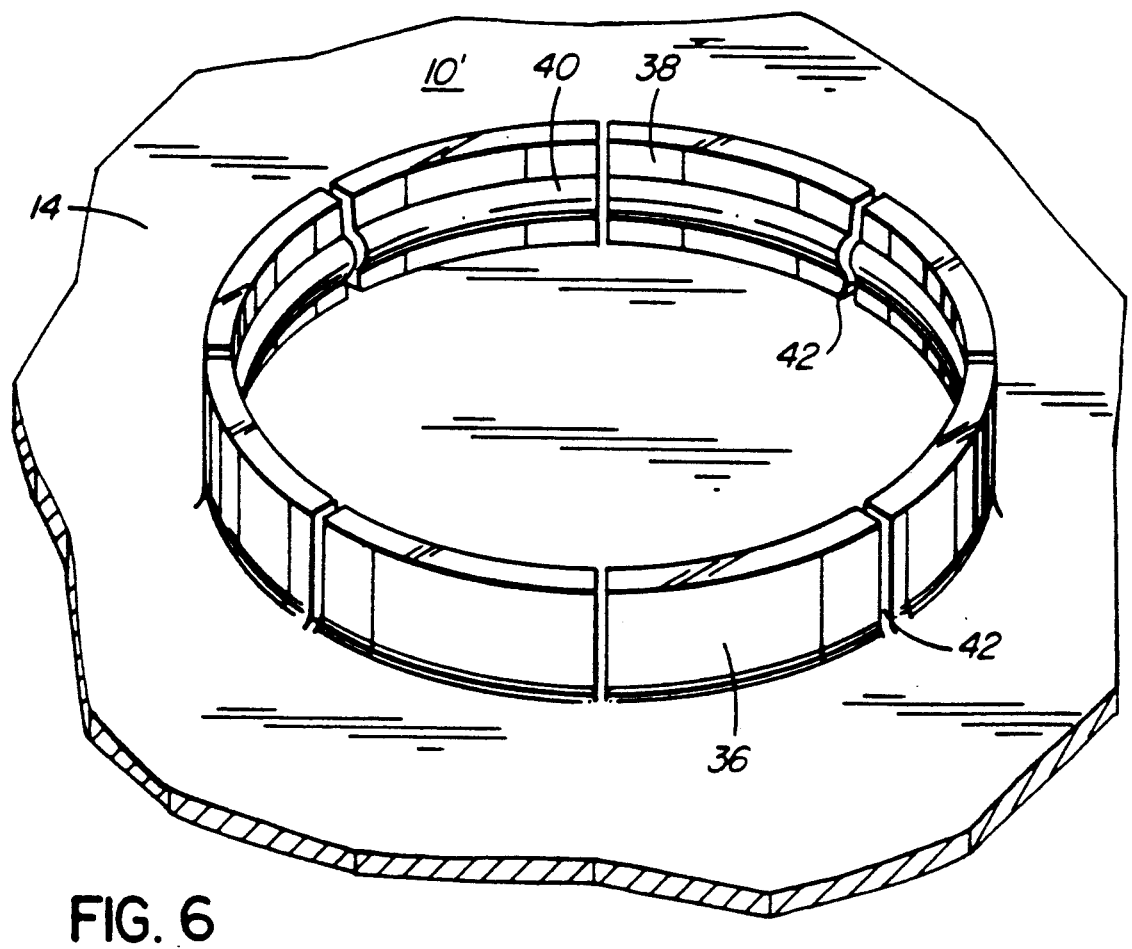
FIG. 6 is a perspective view of the inner surface of a cover showing one embodiment of a wheel cover having a collar with a resilient gripping feature.

Looking firstly at the latter arrangement, it will be seen in FIGS. 6 and 6a that a retaining ring 32 has a circumferentially extending, peripheral groove 34 in the outer surface thereof. As shown in FIG. 6, disc 10' has a collar 36, the inner surface 38 of which has a peripheral bead 40 spaced approximately midway of the depth of the collar and parallel to the surface disc 10'. A plurality of circumferentially spaced slots 42 divide the collar into a plurality of resilient segments. As shown in FIG. 6, the slots extend radially of the center of the collar and are normal to the surface of the cover 10. Using the preferred materials, the slots 42 provide radial flexibility to the segments of the collar 36 so that the cover 10 and particularly the collar 36, can be snapped on to the retaining ring 32 with the peripheral bead 40 snapping into the groove 34 on the disc-retaining ring 32 as shown in FIG. 6a. Thus, the disc can be snapped on or off the retaining ring 32 in a push-pull arrangement.

Figure 11:
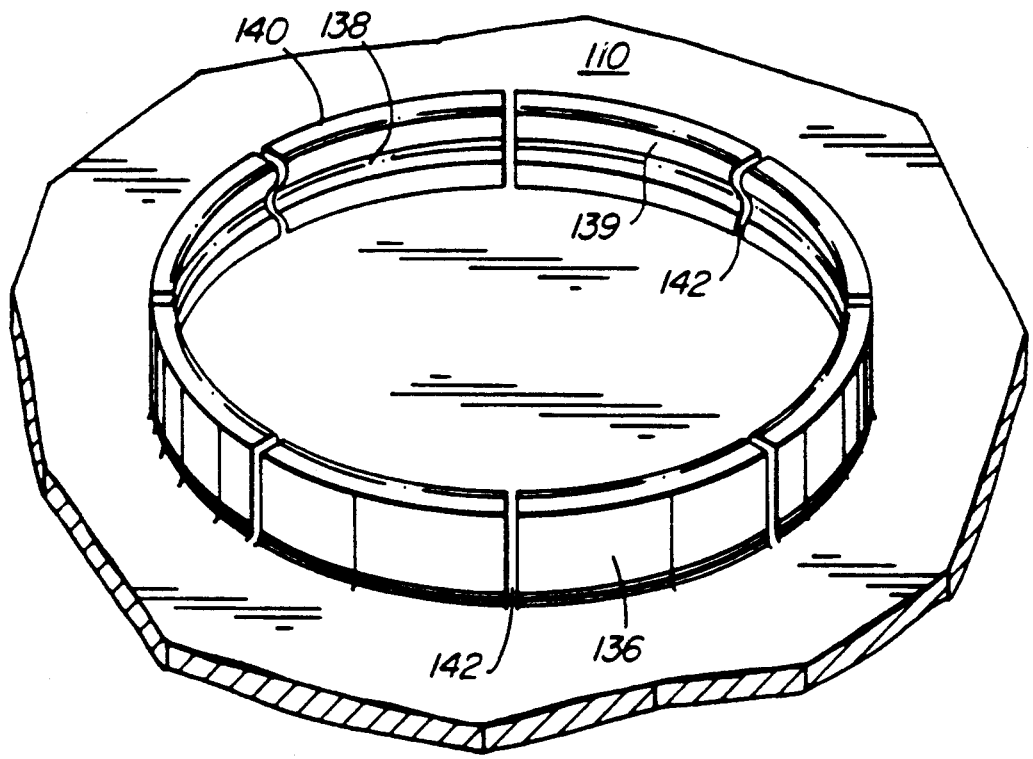
FIG. 11 is a perspective view similar to FIG. 6 but showing a collar having a modified inner contour.
Figure 12:
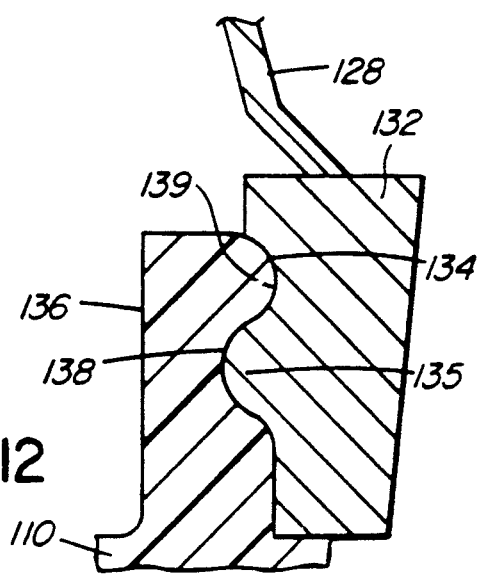
FIG. 12 is a fragmentary cross-sectional view of a portion of the collar of FIG. 11 engaging the ring of a mounting means.

A further embodiment of a snap-on, snap-off arrangement is shown in FIGS. 11 and 12. In this embodiment, the collar 136 is again divided into a plurality of segments by slots 142. As shown in FIG. 12, the collar 136 has, on its inner wall, a groove 138 and a bead 139 which cooperate with corresponding surfaces on the wall of retaining ring 132 which is provided with a groove 134 to accommodate the bead 139 on the collar and its own bead 135 which is received in the groove 138 in the collar.

FIGS. 4 and 7 through 10 show several variations of an arrangement in which the disc 10 is releasably secured to the retaining ring 26. While it is possible to have a retaining ring with a rectangular cross-section and which would interact with the collar 20 on the disc in a friction-fit arrangement, it is preferred that the ring 26 have a frusto-conical cross-section as shown in FIGS. 7-10. With such a configuration, together with a tapered, inner or outer surface on the collar 20 as shown in FIGS. 7-10, a significant centering action is obtained when the disc 10 and specifically the collar 20 is moved into an engaging position with the retaining ring 26.

Figure 7:
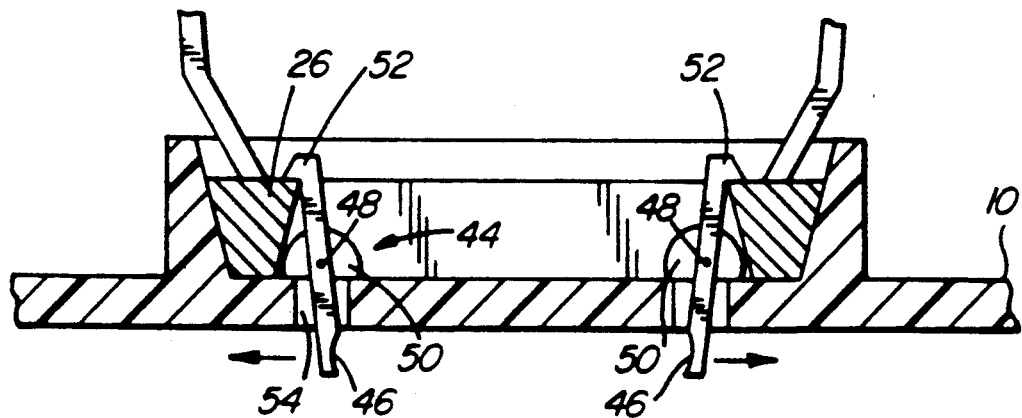
FIGS. 7, 8, 9 and 10 are fragmentary cross-sectional views of several forms of locking members to detachably secure the cover to the retaining ring.

In FIGS. 7-9, releasable locking members indicated generally at 44 are mounted on the inner face of the disc 10 and would comprise, as shown in FIG. 7, at least a pair of latch members including levers 46 pivotally mounted at 48 to the inner face of the disc 10 and provided with suitable springs 50 that bias the latch heads 52 into the illustrated positions of FIG. 7 where the latch heads 52 engage the edge of the retaining ring 26. The levers project through apertures 54 in the surface of the cover and outwardly thereof so that an operator can pivot the levers away from one another (in the direction of the arrows) thereby releasing the latches 52 from the ring 26 to remove the cover 10 from the wheel.

A similar arrangement is shown in FIG. 9 although the levers 146 and their latches 152 are located outwardly of the ring 26 rather than inwardly as in the FIG. 7 arrangement. Moreover, in this arrangement, the collar 20 lies inwardly of the inner edge of the ring 26 rather than outwardly thereof as in FIG. 7.

One preferred form of the releasable locking members is shown in FIG. 8 where levers 56 are pivoted at 58 and their associated latches 60 engage the outer edge of the retaining ring 26 as shown. This arrangement retains the complete latching assembly including the springs 50 and levers 56 on the inner surface of the disc 10 and access to the levers 56 and operation thereof is gained through the inner row of apertures 18 shown in FIGS. 1 and 4.

FIGS. 8 and 9 also illustrate the proximity of the outer collar 22 to the inner collar 20. The outer collar, while not essential, serves the purpose of giving some protection to the inner collar and releasable locking means from inadvertent rough use and possible damage. This is important if maintenance is being carried out on the vehicle wheel and the disc with the locking members thereon is inadvertently dropped on its inner face.

A still further embodiment of the use of releasable locking means for retaining the wheel cover or disc 10 on to the mounting means is shown in FIG. 10. In this arrangement, the levers have their actuating ends 156 protruding outwardly of the disc 10, the inner ends being provided with latches 160 which engage the inside edge of the retaining ring 126. Levers 156 are pivotally mounted by pins 158 located in the body of the disc 10, the levers being biased to their illustrated, engaging position by suitable springs 150. It will be appreciated that the cover can easily be removed from the retaining ring 126 by pressing inwardly on the ends 156 of the levers to remove the latches 160 from the ring and the cover can be pulled away.

Figure 5:
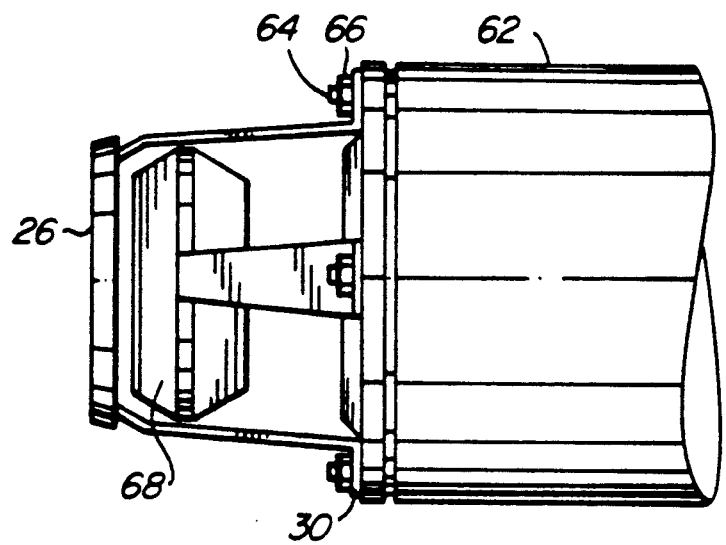
FIG. 5 is a fragmentary elevation view showing the mounting device secured to a wheel hub on which an odometer is located.

FIG. 5 illustrates the retaining ring 26 being secured to the vehicle hub 62 by way of studs 64 and nuts 66 securing the feet 30 to the hub plate. As illustrated, the configuration of the retaining ring 26 is such that the odometer 68 is not interfered with and the numerals on the odometer can easily be read therefrom for recordal purposes and the wheel disc can thereafter be reinstalled.

In order to prevent relative rotation between the cover disc 10 and the retaining ring 26, one or more pins 13 (FIG. 4) may be provided on the inner surface 14 of the disc adjacent the inner collar 20 and corresponding openings 15 (FIGS. 2 and 3) may be provided on the surface of the disc-retaining ring 26 which, together, prevent rotation of the cover relative to the ring.

Being made of a resin material, the cover 10 is easily coloured to match the colour scheme of a commercial vehicle to which it is attached or to that of a fleet colour or the like.

The wheel cover may be attached to the mounting device simply by pushing the inner ends of the collar 20 axially over the ring 26 until the gripping surfaces on the collar of FIG. 6 snap into the groove on the retaining ring or until the spring biased latch members engage the inner edge of the ring.

It will be observed that the combination according to the invention provides quick and easy attachment or removal, without tools, of the cover 10 for routine maintenance such as inflation of the tire or reading the axle odometer and the like. Additionally, the mounting device does not have to be removed from the hub plate when the vehicle tire and wheel are changed as the outside diameter of the mounting device is less than the diameter of the wheel opening so that the vehicle wheel will slip out over the axle end as well as the mounting device.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

The embodiments of the invention in which an exclusive property or privilege is claimed are defined as follows:

1. A combined wheel cover and mounting device for use on dual-wheeled vehicles, said wheel cover comprising:
   a) a circular disc having an outer surface and an inner surface;
   b) a circular collar centrally located on the inner surface of said disc;
   c) said mounting device comprising a circular, disc-retaining ring;

d) at least a pair of leg members connected at one of their ends to said ring;

e) a foot at the other end of each leg for detachable connection of the mounting device to a hub of a vehicle wheel;

f) said disc-retaining ring receiving the collar on the inner surface of said wheel cover;

g) said collar and said retaining ring having a mutually engaging, keyless, detachable connection with one another for retaining said wheel cover on said ring; and h) releasable, keyless locking members on the inner surface of said wheel cover for detachably securing said collar and said cover onto said disc-retaining ring.

2. The combination of claim 1 wherein said releasable keyless locking members comprises a pair of latch members secured on the inner surface of said cover adjacent the rim of said collar and spring members biasing said latch members to engage said disc-retaining ring.

3. The combination of claim 2 wherein said latch members are located inwardly of said collar to engage an inner edge of said disc-retaining ring.

4. The combination of claim 2 wherein said latch members are located outwardly of the periphery of said collar to engage an outer edge of said disc-retaining ring.

5. The combination of claim 2 further including lever members for actuating said latch members, said lever members being accessed through said cover.

6. The combination of claim 2 further including lever members for actuating said latch members, said lever members having ends extending through said cover for access on the outer surface thereof.

7. A combined wheel cover and mounting device for use on dual-wheeled vehicles, said wheel cover comprising:
   a) a circular disc having an outer surface and an inner surface;
   b) a circular collar centrally located on the inner surface of said disc;
   c) said mounting device comprising a circular, disc-retaining ring;
   d) at least a pair of leg members connected at one of their ends to said ring; and
   e) a foot at the other end of each leg for detachable connection of the mounting device to a hub of a vehicle wheel;
   f) said disc-retaining ring receiving the collar on the inner surface of said wheel cover; and
   g) said collar and said retaining ring having a mutually engaging, keyless, detachable connection with one another for retaining said wheel cover on said ring comprising releasable locking members on the inner surface of said cover for detachably securing said collar and said cover onto said disc-retaining ring.

8. A combined wheel cover and mounting device for use on dual-wheeled vehicles, said wheel cover comprising:
   a) a circular disc having an outer surface and an inner surface;
   b) a circular collar centrally located on the inner surface of said disc;
   c) said mounting device comprising a circular, disc-retaining ring for receiving and engaging said collar on the inner surface of said wheel cover;
   d) at least a pair of leg members connected at one of their ends to said ring;
   e) a foot at the other end of each leg for detachable connection of the mounting device to a hub of a vehicle wheel;
   f) releasable locking members for detachably securing said collar and said cover onto said disc-retaining ring and comprising a pair of latch members located on the inner surface of said cover adjacent the rim of said collar and spring members biasing said latch members to engage said disc-retaining ring; and
   g) wherein said latch members are located outwardly of the periphery of said collar to engage an outer edge of said disc-retaining ring.

9. A combined wheel cover and mounting device for use on dual-wheeled vehicles, said wheel cover comprising:
   a) a circular disc having an outer surface and an inner surface;
   b) a circular collar centrally located on the inner surface of said disc;
   c) said mounting device comprising a circular, disc-retaining ring for receiving and engaging said collar on this inner surface of said wheel cover;
   d) at least a pair of leg members connected at one of their ends to said ring;
   e) a foot at the other end of each leg for detachable connection of the mounting device to a hub of a vehicle wheel;
   f) releasable locking members for detachably securing said collar and said cover onto said disc-retaining ring and comprising a pair of latch members located on the inner surface of said cover adjacent the rim of said collar and spring members biasing said latch members to engage said disc-retaining ring; and
   g) lever members for actuating said latch members, said lever members having ends extending through said cover for access on the outer surface thereof.

10. A combined wheel cover and mounting device for use on dual-wheeled vehicles, said wheel cover comprising:
   a) a circular disc having an outer surface and an inner surface;
   b) a circular collar centrally located on the inner surface of said disc;
   c) said mounting device comprising a circular, disc-retaining ring;
   d) at least a pair of leg members connected at one of their ends to said ring;
   e) a foot at the other end of each leg for detachable connection of the mounting device to a hub of a vehicle wheel;
   f) said disc-retaining ring receiving the collar on the inner surface of said wheel cover; and
   g) releasable locking members for detachably securing said collar and said cover onto said disc-retaining ring, comprising a pair of latch members located on the inner surface of said cover adjacent the rim of said collar and spring members biasing said latch members to engage said disc-retaining ring.

* * * * *